United States Patent
Mizo

(10) Patent No.: US 8,502,103 B2
(45) Date of Patent: Aug. 6, 2013

(54) SUBMERGED ARC WELDING APPARATUS AND METHOD FOR SUBMERGED ARC WELDING

(75) Inventor: Yutaka Mizo, Tokyo (JP)

(73) Assignee: IHI Corporation, Tokyo (JP)

( * ) Notice: Subject to any disclaimer, the term of this patent is extended or adjusted under 35 U.S.C. 154(b) by 1289 days.

(21) Appl. No.: 12/301,174

(22) PCT Filed: Apr. 26, 2007

(86) PCT No.: PCT/JP2007/059016
§ 371 (c)(1),
(2), (4) Date: Nov. 17, 2008

(87) PCT Pub. No.: WO2007/132658
PCT Pub. Date: Nov. 22, 2007

(65) Prior Publication Data
US 2009/0188895 A1 Jul. 30, 2009

(30) Foreign Application Priority Data
May 17, 2006 (JP) ................................ 2006-137252

(51) Int. Cl.
*B23K 9/18* (2006.01)
(52) U.S. Cl.
USPC ........ 219/73.2; 219/73; 219/73.1; 219/73.11; 219/73.21; 219/74; 219/75
(58) Field of Classification Search
USPC ............ 219/60 A, 60 R, 73, 73 R, 59.1, 73.2, 219/72, 74, 73.11, 73.21, 126, 125.12
See application file for complete search history.

(56) References Cited

U.S. PATENT DOCUMENTS

| | | | | |
|---|---|---|---|---|
| 4,005,305 A | * | 1/1977 | Nelson et al. | 219/72 |
| 4,136,273 A | * | 1/1979 | Eujita et al. | 219/121.36 |
| 4,172,974 A | * | 10/1979 | Stingelin et al. | 219/72 |

(Continued)

FOREIGN PATENT DOCUMENTS

| DE | 34 30 394 A1 | 2/1986 |
|---|---|---|
| DE | 3430394 A1 | 2/1986 |

(Continued)

OTHER PUBLICATIONS

Office Action issued in corresponding Chinese Patent Application No. 200780017984.2, issued Dec. 6, 2010.

(Continued)

*Primary Examiner* — Joseph M Pelham
*Assistant Examiner* — Jimmy Chou
(74) *Attorney, Agent, or Firm* — Griffin & Szipl, P.C.

(57) ABSTRACT

A submerged arc welding apparatus of the present invention includes: a flux receiver for receiving and holding flux in an area formed by itself and a workpiece inside thereof when abutting against the workpiece on the open side; a flux feeder for supplying flux to the flux receiver; a welding torch for supplying a welding wire toward the workpiece with the tip disposed in the area where the flux is held; and a moving mechanism for moving the flux receiver and the welding torch along the direction of a welding line of the workpiece with the flux receiver abutting against the workpiece. A submerged arc welding method of the present invention includes: performing welding by opposing the welding torch to the workpiece and by moving the welding torch along the direction of the welding line with flux held in an area formed between the workpiece and the welding torch.

12 Claims, 3 Drawing Sheets

(56) References Cited

U.S. PATENT DOCUMENTS

| | | | |
|---|---|---|---|
| 4,175,227 A * | 11/1979 | Kasper | 219/125.12 |
| 4,179,059 A * | 12/1979 | Chang et al. | 228/103 |
| 4,348,574 A * | 9/1982 | Barger et al. | 219/73.21 |
| 4,395,614 A * | 7/1983 | Weil et al. | 219/72 |
| 4,400,611 A * | 8/1983 | Wilkinson | 219/137 R |
| 4,414,459 A * | 11/1983 | Sims et al. | 219/73.2 |
| 4,451,723 A * | 5/1984 | Gres et al. | 219/98 |
| 4,500,765 A * | 2/1985 | Trotter | 219/73.21 |
| 4,521,669 A * | 6/1985 | Porter et al. | 219/125.11 |
| 4,816,637 A * | 3/1989 | Sanders et al. | 219/121.59 |
| 5,004,885 A * | 4/1991 | Juschenko et al. | 219/73.2 |
| 5,070,225 A * | 12/1991 | Paton et al. | 219/73 |
| 5,686,002 A * | 11/1997 | Flood et al. | 219/137 R |
| 5,852,271 A * | 12/1998 | Offer | 219/72 |
| 6,373,019 B1 * | 4/2002 | Offer et al. | 219/72 |
| 6,894,251 B2 * | 5/2005 | Offer | 219/128 |
| 7,399,941 B2 * | 7/2008 | Causte et al. | 219/75 |
| 2009/0188895 A1 | 7/2009 | Mizo | |

FOREIGN PATENT DOCUMENTS

| | | | |
|---|---|---|---|
| GB | 1564295 A | | 4/1980 |
| JP | 50-1047 | | 1/1975 |
| JP | 53 112240 | | 9/1978 |
| JP | 54103761 A | * | 8/1979 |
| JP | 63-049370 | | 3/1988 |
| JP | 63-063571 | | 3/1988 |
| JP | 63049370 A | * | 3/1988 |
| JP | 1180753 A | | 7/1989 |
| JP | 08-281437 | | 10/1996 |
| JP | 11-347735 | | 12/1999 |
| JP | 2002-120068 | | 4/2002 |
| JP | 2002-248566 | | 9/2002 |

OTHER PUBLICATIONS

Supplementary European Search Report issued in European Application No. 07742451.3, completed Mar. 28, 2011, mailed Apr. 4, 2011.

International Search Report issued in corresponding application No. PCT/JP2007/059016, completed Jul. 11, 2007 and mailed Jul. 24, 2007.

Office action in corresponding GCC Patent Application No. GCC/P/2007/8308 dated Oct. 1, 2011.

Webster's New Collegiate Dictionary 436 and 852 (1977).

* cited by examiner ized.
SUBMERGED ARC WELDING APPARATUS AND METHOD FOR SUBMERGED ARC WELDING This is a National Phase Application in the United States of International Patent Application No. PCT/JP2007/059016 filed Apr. 26, 2007, which claims priority on Japanese Patent Application No. 137252/2006, filed May 17, 2006. The entire disclosures of the above patent applications are hereby incorporated by reference.

BACKGROUND OF THE INVENTION

1. Field of the Invention

The present invention relates to an submerged arc welding apparatus and method for submerged arc welding capable of performing submerged arc welding in a vertical position.

2. Description of the Related Art

Submerged arc welding is a welding process including previously spreading powder flux over a workpiece (base material), feeding a welding wire into it to strike an arc between the welding wire and the workpiece, and fusion-welding the workpiece and the welding wire by means of the arc heat. This process is referred to as submerged arc welding since the arc is invisible during welding.

This type of submerged arc welding process has the advantages: (1) available large current enables high deposition rate and high efficiency; (2) weld penetration is deep; (3) light-shielding is unnecessary due to the arc covered with flux and substantially no weld fume is made, whereby good working conditions are achieved; (4) beautiful bead appearance is obtained.

There are the following patent documents 1 to 4, for example, as related art documents on the submerged arc welding process.

In the methods disclosed in Patent Document 1 and Patent Document 2, submerged arc welding is performed with flux spread over a workpiece placed in a horizontal position and with a welding torch opposed to the workpiece from thereabove.

In the method disclosed in Patent Document 3, submerged arc welding is performed by disposing an extendable tubular hopper tank under a workpiece placed in a horizontal position, filling the tubular hopper tank with flux, and supplying the flux to a weld zone of the workpiece from below by pushing up the bottom of the tubular hopper tank.

In the method disclosed in Patent Document 4, submerged arc welding is performed with a welding torch opposed in a horizontal position to a workpiece (for example, a side panel of a cylindrical tank) which is placed in a vertical position and has a welding line extending in a horizontal direction.

[Patent Document 1]
Japanese Patent Laid-Open No. H8-281437
[Patent Document 2]
Japanese Patent Laid-Open No. 2002-120068
[Patent Document 3]
Japanese Patent Laid-Open No. H11-347735
[Patent Document 4]
Japanese Patent Laid-Open No. S63-63571

Incidentally, for example, in manufacturing a crude oil tank or an LPG tank, welding in a vertical position is required in the field in some cases. The term "vertical position" in welding means a position that is used for welding a workpiece having a welding line extending in a height direction.

The conventional submerged arc welding methods, however, have not been applicable to the vertical position, since the welding position is limited to the flat position (the methods in Patent Documents 1 and 2), the overhead position (the method in Patent Document 3), and the horizontal position (the method in Patent Document 4) from reasons of necessity to retain flux in a joint (butt joint, groove joint, lap joint, fillet weld joint or the like) of the workpiece.

Therefore, in the case of a need for welding in the vertical position, the welding has been performed using a coated arc welding process or a gas shield arc welding process capable of performing welding in the vertical position. Due to various advantages of the submerged arc welding process including high efficiency, there has been a strong demand for it to be applied to the vertical position.

SUMMARY OF THE INVENTION

The present invention has been provided in view of the background described above. Therefore, it is an object of the present invention to provide an submerged arc welding apparatus and method for submerged arc welding capable of performing submerged arc welding in the vertical position.

To achieve the above object, the submerged arc welding apparatus and method for submerged arc welding according to the present invention use the following means.

According to a first aspect of the present invention, there is provided a submerged arc welding apparatus for performing submerged arc welding for a workpiece which is placed in a vertical position and has a welding line extending in a height direction, comprising: a flux receiver having an open side and adapted to receive and hold flux in an area formed by itself and the workpiece inside thereof when abutting against the workpiece on the open side; a flux feeder for supplying flux to the flux receiver; a welding torch for supplying a welding wire toward the workpiece with its tip disposed in the area; and a moving mechanism for moving the flux receiver and the welding torch along the direction of the welding line of the workpiece with the flux receiver abutting against the workpiece.

As described above, the flux receiver has the open side and is adapted to receive and hold flux in the area formed by itself and the workpiece inside thereof when abutting against the workpiece on the open side. Therefore, the flux supplied by the flux feeder can be maintained. In addition, the welding torch is disposed in the above area and therefore an arc can be generated in the flux.

Therefore, the submerged arc welding can be performed in a vertical position by moving the flux receiver and the welding torch using the moving mechanism along the direction of the welding line extending in the height direction with the flux receiver abutting against the workpiece and generating an arc between the welding wire supplied from the welding torch in the flux and the workpiece.

Moreover, in the submerged arc welding apparatus according to the present invention, the flux receiver includes a body for holding the flux and a flexible flux sealing portion provided on the open side of the body.

As described above, the submerged arc welding apparatus has the flexible flux sealing portion on the open side of the body. Therefore, the flexible flux sealing portion appropriately deforms when the flux receiver abuts against the workpiece, thereby ensuring good contact between the end of the flux receiver on the open side and the workpiece and therefore reducing the leakage of the flux from therebetween.

Furthermore, in the submerged arc welding apparatus according to the present invention, the flux sealing portion includes a flexible skirt portion which widens toward the horizontal outside and downward relative to the surface of the workpiece in the direction of the open side and an elastic member for elastically supporting the skirt portion.

Since the flux sealing portion includes the skirt portion and the elastic member configured described above, the skirt portion is elastically pressed to the workpiece by an action of the elastic member when the flux receiver abuts against the workpiece. This ensures good contact between the skirt portion and the workpiece, which reduces the leakage of the flux from therebetween.

Furthermore, in the submerged arc welding apparatus according to the present invention, the elastic member elastically supports the skirt portion at a plurality of positions in the horizontal direction relative to the surface of the workpiece in the lower side portion of the body in the skirt portion.

As described above, the elastic member elastically supports the skirt portion at the plurality of positions in the horizontal direction relative to the surface of the workpiece in the lower side portion of the body in the skirt portion. Therefore, the skirt portion deforms to accommodate the unevenness on the surface of the workpiece such as a weld bead. Accordingly, it is possible to effectively reduce the leakage of the flux from between the skirt portion and the workpiece.

Furthermore, in the submerged arc welding apparatus according to the present invention, the flux receiver has a rotatable receiver roller disposed in an abutting position against the workpiece when the flux sealing portion abuts against the workpiece.

Although the flux receiver moves while abutting against the workpiece, the flux receiver can move smoothly since it has the receiver roller as described above, while the flux sealing portion reduces the leakage of the flux.

Moreover, in the submerged arc welding apparatus according to the present invention, the moving mechanism has a pressing device for pressing the flux receiver to the workpiece.

Since the pressing device presses the flux receiver to the workpiece, the flux receiver can be pressed to the workpiece with an appropriate pressing force even after the flux receiver is positioned relative to the workpiece.

Furthermore, in the submerged arc welding apparatus according to the present invention, the welding torch is provided in such a way as to pass through the side opposite to the open side of the flux receiver.

As described above, the welding torch is provided in such a way as to pass through the side opposite to the open side of the flux receiver. Thereby, the welding torch can be disposed so that its tip is located in the area where the flux is held without significantly bending the welding torch and without increasing the size of the flux receiver wastefully.

Furthermore, in the submerged arc welding apparatus according to the present invention, the moving mechanism has an oscillating device for reciprocating the tip of the welding torch in the direction of crossing the welding line and the flux receiver has a measure of flexibility to accommodate changes in relative position between the flux receiver and the welding torch which accompany the reciprocation of the welding torch.

If this type of oscillating device is provided, the relative position between the flux receiver and the welding torch changes with the reciprocation of the welding torch. The flux receiver, however, has the flexibility to accommodate the changes. Therefore, welding can be smoothly performed without restricting the reciprocation of the welding torch while preventing the leakage of the flux from between the flux receiver and the welding torch.

Furthermore, according to another aspect of the present invention, there is provided a submerged arc welding method of performing submerged arc welding for a workpiece which is placed in a vertical position and has a welding line extending in a height direction, comprising performing welding by opposing the welding torch to the workpiece and by moving the welding torch along the direction of the welding line with flux held in an area formed between the workpiece and the welding torch.

According to the present invention, it is possible to obtain a beneficial effect such that submerged arc welding can be performed in the vertical position.

DETAILED DESCRIPTION OF THE PREFERRED EMBODIMENTS

Figure 1:
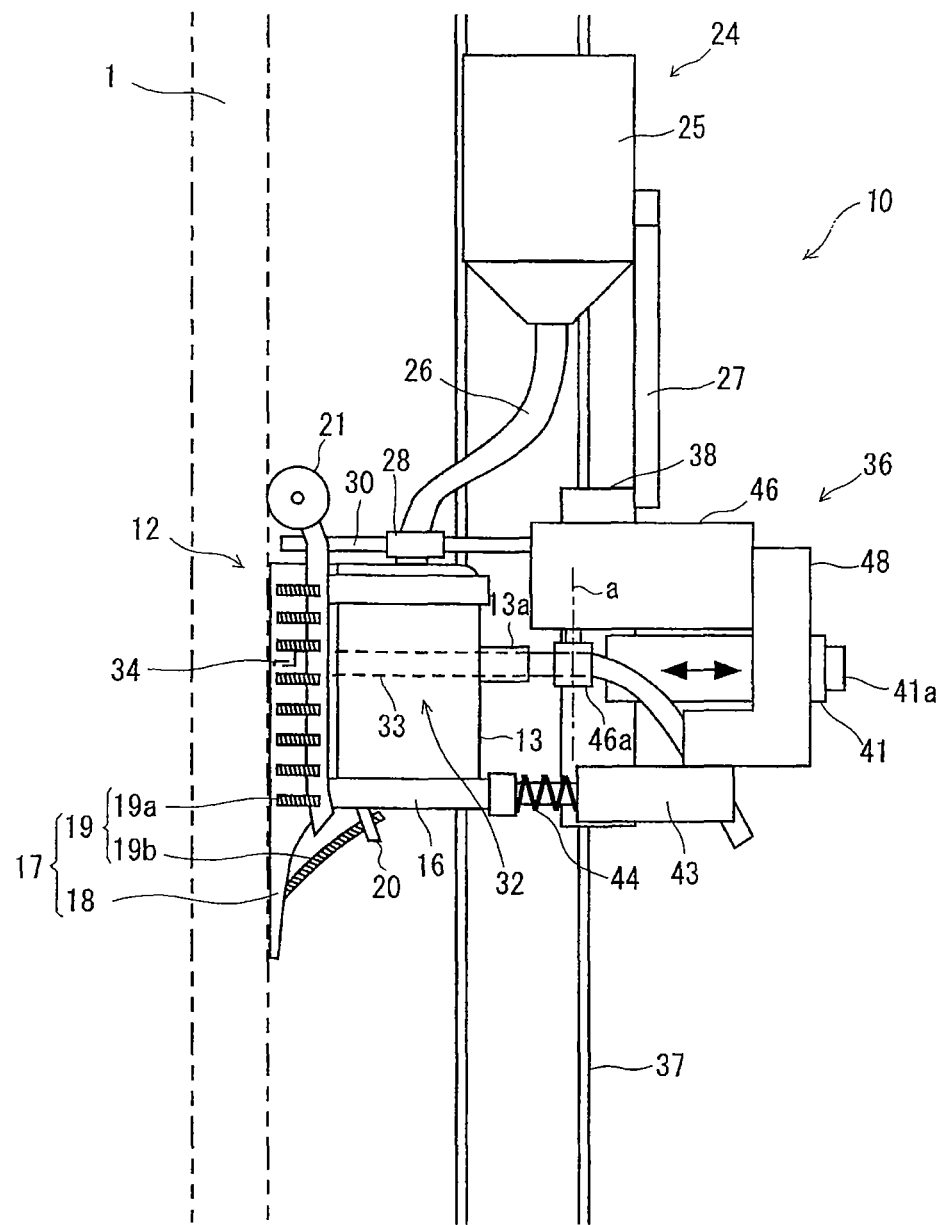
FIG. 1 is a left side elevation view of a submerged arc welding apparatus according to an embodiment of the present invention.

The preferred embodiments of the present invention will now be described in detail hereinafter with reference to the accompanying drawings. The same reference numerals refer to the same parts throughout the various figures to omit duplicated description.

Figure 2:
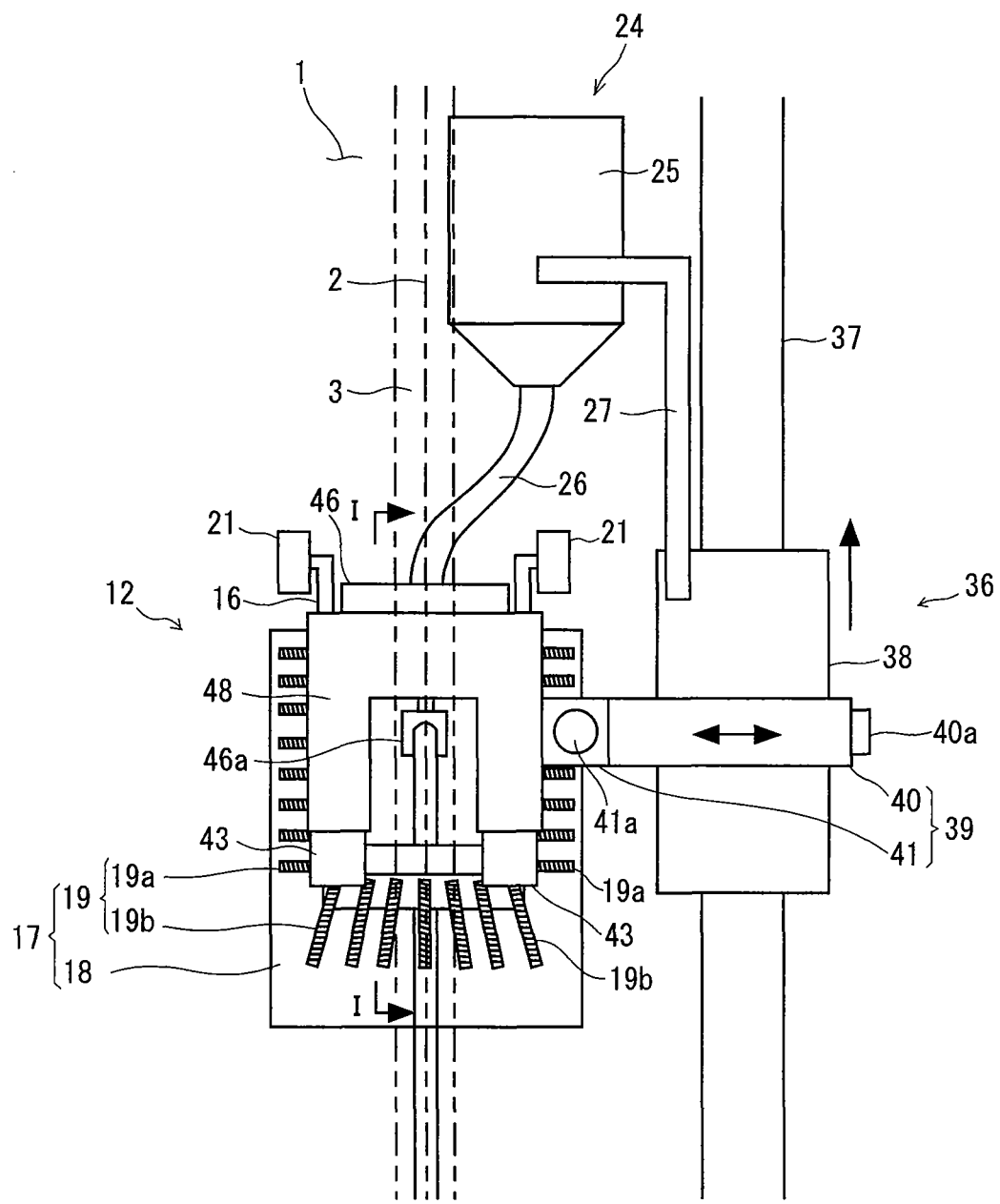
FIG. 2 is a front view of the submerged arc welding apparatus according to the embodiment of the present invention.

Referring to FIG. 1 and FIG. 2, there are shown diagrams of a submerged arc welding apparatus 10 according to an embodiment of the present invention: FIG. 1 is a left side elevation view and FIG. 2 is a front view.

The submerged arc welding apparatus 10 is for use in performing submerged arc welding for a workpiece (base material) 1 which is placed in a vertical position and has a welding line 2 extending in a height direction. Note here that the term "height direction" has a concept including not only the vertical direction, but also directions inclined to the vertical direction. Therefore, although the welding line 2 of the workpiece 1 extends in the vertical direction as shown in FIG. 2 in this embodiment, the present invention is not limited thereto, but can be applied to welding of a workpiece having a welding line 2 extending in a direction inclined to the vertical direction.

The submerged arc welding apparatus 10 includes a flux receiver 12, a flux feeder 24, a welding torch 32, and a moving mechanism 36 as main components.

Figure 3:
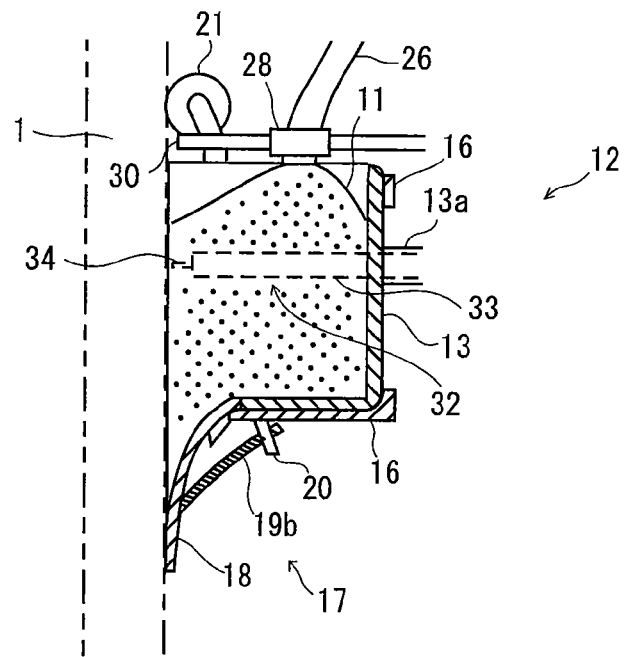
FIG. 3 is a cross section taken on line I-I of FIG. 2.
Figure 4:
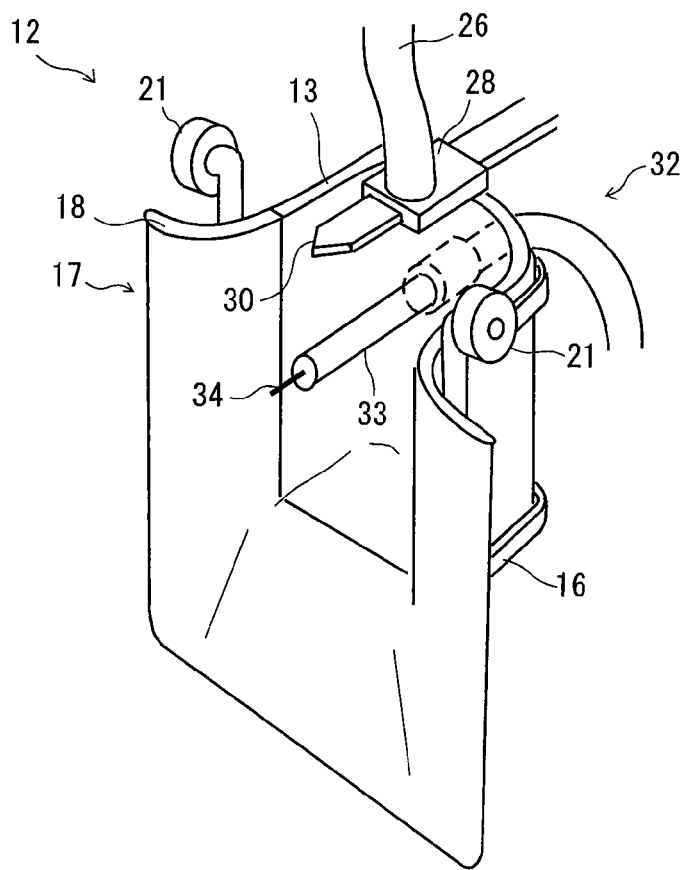
FIG. 4 is a perspective diagram of a flux receiver in the submerged arc welding apparatus according to the embodiment of the present invention.

FIG. 3 is a cross section of the flux receiver 12 in FIG. 2 taken on line I-I thereof. FIG. 4 is a perspective diagram of the flux receiver 12. The following description will be given with reference to FIG. 3 and FIG. 4 as well as FIG. 1 and FIG. 2.

The flux receiver 12 is configured with one side (the side abutting against the workpiece 1) opened so that flux 11 is received and held in an area formed by the flux receiver 12 and the workpiece 1 inside thereof when the flux receiver 12 abuts against the workpiece 1 on the open side. More specifically, as shown in FIG. 3, when the flux receiver 12 abuts against the workpiece 1 on the open side of the flux receiver 12, the open side of the flux receiver 12 is closed by the workpiece 1, by which the flux receiver 12 can hold the supplied flux 11 inside and retain it in a joint (the area of a groove 2 in this embodiment) on the workpiece 1.

The flux 11 is a powder material used for the purpose of removing deleterious materials such as oxide of the workpiece 1 and a filler material, protecting the surface of the workpiece 1, or refining weld metal.

The flux receiver 12 has a body 13 for holding the flux 11 and a flexible flux sealing portion 17 which is provided on the open side of the body 13.

The body 13 is preferably made of a material which is superior in heat resistance. In this embodiment, the body 13 is made of glass wool, heat resistant fabric which is woven from aramid fiber, metallic mesh or the like.

The upper part of the body 13 is opened, so that it can receive the flux 11 supplied by the flux feeder 24 from the upper part. Furthermore, the body 13 is attached to a frame 16, which supports the body 13, by which the basic form thereof is maintained.

The flux sealing portion 17 includes a skirt portion 18 and an elastic member 19.

The skirt portion 18 widens toward the horizontal outside and downward relative to the surface of the workpiece 1 in the direction of the open side. Hereinafter, the portion widening from both sides of the body 13 in the skirt portion 18 is referred to as "side skirt portion" and the portion widening from the downside of the body 13 is referred to as "lower skirt portion." Moreover, it is assumed that the term "horizontal direction" means the horizontal direction relative to the surface of the workpiece 1.

The skirt portion 18 is preferably made of material superior in heat resistance. In this embodiment, it is made of glass wool or heat resistant fabric which is woven from aramid fiber.

The elastic member 19 elastically supports the skirt portion 18. More specifically, the elastic member 19 elastically bears a force that the skirt member 18 receives from the workpiece 1 side when the flux receiver 12 is pushed to the workpiece 1. In this embodiment, the elastic member 19 includes a side elastic member 19a for supporting the side skirt portion and a lower elastic member 19b for supporting the lower skirt portion.

In this embodiment, the side elastic member 19a includes a plurality of coil springs attached to a portion of the frame 16, which is located on both sides of the flux receiver 12 and to the open side thereof extending in the height direction, at intervals in the height direction.

In this embodiment, the lower elastic member 19b includes a plurality of coil springs attached to a fixed piece 20, which is located in the lower part of the frame 16 and extends in the horizontal direction, at intervals in the horizontal direction. The lower elastic member 19b having the above configuration elastically supports the skirt portion 18 at a plurality of positions in the horizontal direction relative to the surface of the workpiece 1 in the lower skirt portion.

The elastic member 19 in the present invention is not limited to the above shape and arrangement, but various shapes and arrangements can be used for the elastic member 19 within a range where the skirt portion 18 can perform the function of elastically supporting the force received from the workpiece 1 side when the flux receiver 12 is pushed to the workpiece 1.

Moreover, the flux receiver 12 has a rotatable receiver roller 21 disposed in an abutting position against the workpiece 1 when the flux sealing portion 17 (the skirt portion 18 here) abuts against the workpiece 1. In this embodiment, the receiver roller 21 is provided in the upper end of the portion of the frame 16 to which the side elastic member 19a is attached in each side.

Although the body 13 and the skirt portion 18 are manufactured separately and then seamed and joined at their ends in this embodiment, they can be manufactured as a single-piece component.

The flux feeder 24 supplies the flux 11 to the flux receiver 12. In this embodiment, it includes a flux hopper 25, which is disposed above the flux receiver 12 and functions as a supply source of the flux 11, and a flux supply pipe 26, which is connected to the flux hopper 25 at the upper end and faces the flux receiver 12 at the lower end.

The flux hopper 25 is fixed to a traveling carriage 38 of a moving mechanism 36 described later via a hopper fixture 27 and moves along with the traveling of the traveling carriage 38.

The position of the flux supply pipe 26 is fixed at the lower end by a pipe fixture 28. The pipe fixture 28 is fixed to an oscillating device 46 described later.

In addition, a groove tracing pin 30, which is sharp at the end toward the open side of the flux receiver 12, is attached to the pipe fixture 28. The groove tracing pin 30 is used to facilitate the alignment of the tip of the welding torch 32 to the position of the groove 3 during positioning of the welding torch 32.

The welding torch 32 is used to supply a welding wire 34 toward the workpiece 1, with the tip disposed in the area formed by the flux receiver 12 and the workpiece 1 inside thereof. The welding torch 32 has a tubular torch body 33 and supplies the welding wire 34, which is supplied from a wire feeder not shown and connected to the other end of the torch body 33, to a joint of the workpiece 1 through the inside of the torch body 33.

In this embodiment, the welding torch 32 passes through the side opposite to the open side of the flux receiver 12. A protruding portion 13a protruding outwardly from the body 13 is provided in the portion through which the welding torch 32 passes in the body 13 so as to cover the welding torch 32 over a predetermined length in the axial direction. The protruding portion 13a prevents the leakage of the flux from the pass-through portion.

In this embodiment, the moving mechanism 36 includes a traveling rail 37 laid in a direction along the welding line 2, a traveling carriage 38 for automatically traveling on the traveling rail 37, a position control mechanism 39 provided in the traveling carriage 38, a pressing device 43 for pressing the flux receiver 12 to the workpiece 1, and the oscillating device 46 for reciprocating the tip of the welding torch 32 in the direction of crossing the welding line 2.

In this embodiment, the traveling rail 37 is an H-beam and the traveling carriage 38 travels on the flange of the H-beam used as a rail.

The position control mechanism 39 includes a horizontal slide 40 for adjusting the horizontal position (in the horizontal direction in FIG. 2) of the flux receiver 12 and that of the welding torch 32 and an up and down slide 41 for adjusting a distance between the flux receiver 12 or the welding torch 32 and the workpiece 1. The direction of adjustment of the up and down slide is the same as the horizontal direction in FIG. 1.

The horizontal slide 40 and the up and down slide 41 have adjust knobs 40a and 41a, respectively, and the position can be adjusted by rotating the adjust knobs 40a and 41a.

Both of the pressing device 43 and the oscillating device 46 are fixed to a joint member 48 and the joint member 48 is fixed to the position control mechanism 39. The end of the pressing device 43 is fixed to the frame 16. With this arrangement, the flux receiver 12 can be pressed to the workpiece 1 with an appropriate pressing force. Although the pressing device 43 uses an elastic force of the spring 44 in this embodiment, an air cylinder device or a hydraulic cylinder device can be used instead.

The oscillating device 46 has a head 46*a* swinging around an axis line a, which is in parallel with the welding line 2. The welding torch 32 is fixed to the head 46*a*. With this arrangement of the oscillating device 46, it is possible to reciprocate (oscillate) the tip of the welding torch 32 in a direction crossing the welding line 2 (in the horizontal direction in FIG. 2) by swinging the welding torch 32. The relative position between the flux receiver 12 and the welding torch 32 changes with the reciprocation of the welding torch 32. The flux receiver 12 made of heat resistant fabric, however, has a measure of flexibility to accommodate the changes in relative position described above. Therefore, it does not lead to a harmful effect of the movement of the welding torch 32.

The head 46*a* is not limited to the swinging type, but can be one flatly reciprocating in the horizontal direction. In addition, the oscillating device 46 is optionally mounted as required. Therefore, the present invention is also applicable to an arrangement without the provision of the oscillating device 46 and without the reciprocation of the welding torch 32.

The following describes the operation of the submerged arc welding apparatus 10 according to this embodiment.

The adjust knob 40*a* of the horizontal slide 40 of the position control mechanism 39 is turned to adjust the tip of the welding torch 32 to the position in which it points to the welding line 2. In this condition, the horizontal position can be adjusted easily and accurately by adjusting the tip of the groove tracing pin 30 to the position in which it points to the welding line 2. Moreover, the adjust knob 41*a* of the up and down slide 41 is turned to adjust the position of the flux receiver 12 in such a way that the flux receiver 12 abuts against the workpiece 1. In this condition, the position is adjusted so that the flux receiver 12 is pressed to the workpiece 1 with a certain pressing force. This causes the skirt portion 18 to be elastically pressed to the workpiece 1 by an action of the elastic member 19, thereby improving the contact between the skirt portion 18 and the workpiece 1.

When the flux 11 is supplied to the flux receiver 12 from the flux feeder 24, the flux 11 is held in the area formed by the flux receiver 12 and the workpiece 1 inside thereof. In this situation, the skirt portion 18 is elastically supported by the elastic member 19 and pressed to the workpiece 1 to ensure good contact, which reduces the leakage of the flux 11 from between the skirt portion 18 and the workpiece 1. Therefore, a sufficient amount of flux 11 for the submerged arc welding can be retained in the joint (the portion of the groove 3 in this embodiment) of the workpiece 1.

Then, the flux receiver 12 and the welding torch 32 are moved by the moving mechanism 36 along the direction of the welding line 2 extending in the height direction with the flux receiver 12 abutting against the workpiece 1. In this embodiment, they are moved upward. In this operation, the tip of the welding torch 32 is reciprocated as described above using the oscillating device 46. Herewith, an arc is generated between the welding wire 34 supplied from the welding torch 32 and the workpiece 1 in the flux 11 to perform welding.

As described above, the submerged arc welding method according to the present invention can be performed by the submerged arc welding apparatus 10. More specifically, according to the present invention, there is provided the submerged arc welding method of performing submerged arc welding for the workpiece 1 which is placed in the vertical position and has the welding line 2 extending in the height direction, including performing welding by opposing the welding torch 32 to the workpiece 1 and by moving the welding torch 32 along the direction of the welding line 2 with flux 11 held in the area formed between the workpiece 1 and the welding torch 32.

The following describes the working and effect of the submerged arc welding apparatus 10 according to this embodiment.

According to this embodiment, the flux receiver 12 has an open side and is configured to receive and hold the flux 11 in the area formed by itself and the workpiece 1 inside thereof when the flux receiver 12 abuts against the workpiece 1 on the open side. Therefore, the flux 11 supplied by the flux feeder 24 can be maintained. In addition, the welding torch 32 is disposed in the above area and therefore an arc can be generated in the flux 11.

Accordingly, submerged arc welding can be performed in the vertical position by moving the flux receiver 12 and the welding torch 32 along the direction of the welding line 2 extending the height direction with the flux receiver 12 abutting against the workpiece 1 by means of the moving mechanism 36 and generating an arc between the welding wire 34 supplied from the welding torch 32 and the workpiece 1 in the flux 11.

Furthermore, according to this embodiment, the submerged arc welding apparatus 10 has the flexible flux sealing portion 17 at the end of the body 13 on the open side. Therefore, the flexible flux sealing portion 17 appropriately deforms when the flux receiver 12 abuts against the workpiece 1, which ensures good contact between the end of the flux receiver 12 on the open side and the workpiece 1, thereby reducing the leakage of the flux 11 from therebetween.

Furthermore, according to this embodiment, the flux sealing portion 17 includes the skirt portion 18 and the elastic member 19 configured as described above. Therefore, the skirt portion 18 is elastically pressed to the workpiece 1 by the action of the elastic member 19 when the flux receiver 12 abuts against the workpiece 1. This ensures good contact between the skirt portion 18 and the workpiece 1, thereby reducing the leakage of the flux 11 from therebetween.

Still further, according to this embodiment, the elastic member 19 elastically supports the skirt portion 18 at the plurality of positions in the horizontal direction relative to the surface of the workpiece 1 in the lower side portion of the body 13 in the skirt portion 18. Therefore, the skirt portion 18 deforms to accommodate the unevenness on the surface of the workpiece 1 such as a weld bead. Accordingly, it is possible to effectively reduce the leakage of the flux 11 from between the skirt portion 18 and the workpiece 1.

Furthermore, according to this embodiment, the flux receiver 12 has the above-described receiver rollers 21 though the flux receiver 12 moves while abutting against the workpiece 1. Therefore, the flux receiver 12 can move smoothly while reducing the leakage of the flux 11 by the flux sealing portion 17.

Furthermore, according to this embodiment, the flux receiver 12 is pressed to the workpiece 1 by the pressing mechanism. Therefore, the flux receiver 12 can be pressed to the workpiece 1 with an appropriate pressing force even after the flux receiver 12 is positioned relative to the workpiece 1.

Furthermore, according to this embodiment, the welding torch 32 is provided in such a way as to pass through the side opposite to the open side of the flux receiver 12, by which the welding torch 32 can be disposed so that its tip is located in the area where the flux 11 is held without significantly bending the welding torch 32 and without increasing the size of the flux receiver 12 wastefully.

Although the relative position between the flux receiver 12 and the welding torch 32 changes with the reciprocation of the welding torch 32 if the oscillating device 46 as described above is provided, the flux receiver 12 has a measure of flexibility to accommodate the changes according to this embodiment, thereby preventing the leakage of the flux from between the flux receiver 12 and the welding torch 32 and allowing welding to be carried out smoothly without restricting the reciprocation of the welding torch 32.

While the groove joint has been welded as for the shape of joint of the workpiece 1 in this embodiment, the present invention is not limited thereto but is also applicable to other joint shapes (butt joint, lap joint, and fillet weld joint). If this is the case, the flux receiver 12 needs to have a shape adapted to the shape of a joint to be welded so that it can perform the function. More specifically, the flux receiver 12 needs to be configured to receive and hold the flux 11 in the area formed by itself and the workpiece 1 inside thereof when it abuts against the workpiece 1.

Although the embodiments of the present invention have been described hereinabove, the embodiments of the present invention disclosed in the above are only illustrative and the scope of the present invention is not limited by these embodiments of the present invention. The scope of the present invention is defined by the description of the claims and further intended to include the meaning equivalent to the claims and all modifications within the scope.

What is claimed is:

1. A submerged arc welding apparatus for performing submerged arc welding for a workpiece that is placed in a vertical position and has a welding line extending in a height direction, wherein the submerged arc welding apparatus comprises:
    (a) a flux receiver having an open side and adapted to receive and hold flux in an area defined by the flux receiver and the workpiece, wherein the area is disposed inside of the flux receiver when the flux receiver abuts against the workpiece on the open side;
    (b) a flux feeder disposed to supply flux to the flux receiver;
    (c) a welding torch disposed to supply a welding wire toward the workpiece with a tip of the welding torch disposed in the area; and
    (d) a moving mechanism operable to move the flux receiver and the welding torch along a direction of the welding line of the workpiece with the flux receiver abutting against the workpiece,
    wherein the flux receiver includes a body for holding the flux and a flexible flux sealing portion provided at an open side of the body, wherein the flux sealing portion includes a flexible skirt portion that flanges toward a lateral direction and a downward direction relative to a direction of the open side of the body, and an elastic member separate from the flexible skirt portion is disposed to elastically press the skirt portion to a surface of the workpiece.

2. A submerged arc welding apparatus according to claim 1, wherein the elastic member elastically supports side skirt portions of the flexible skirt portion at a plurality of positions in the lateral direction relative to the direction of the open side of the body and the elastic member elastically supports a lower skirt portion of the flexible skirt portion to a lower side portion of the body.

3. A submerged arc welding apparatus according to claim 1, wherein the flux receiver further includes a rotatable receiver roller disposed in an abutting position against the workpiece when the flux sealing portion abuts against the workpiece.

4. A submerged arc welding apparatus according to claim 1, wherein the moving mechanism has a pressing device for pressing the flux receiver to the workpiece.

5. A submerged arc welding apparatus according to claim 1, wherein the welding torch is arranged so as to pass through a side of the flux receiver that is opposite to the open side of the flux receiver.

6. A submerged arc welding apparatus according to claim 3, wherein the moving mechanism has an oscillating device for reciprocating the tip of the welding torch in the direction of crossing the welding line and wherein the flux receiver has flexibility sufficient to accommodate changes in relative position between the flux receiver and the welding torch that accompany reciprocation of the welding torch.

7. A submerged arc welding method of performing submerged arc welding for a workpiece that is placed in a vertical position and has a welding line extending in a height direction, wherein the method comprises the steps of:
    providing a submerged arc welding apparatus according to claim 1; and
    performing welding by opposing the welding torch of the submerged arc welding apparatus to the workpiece and by moving the welding torch along the direction of the welding line with flux held in an area formed between the workpiece and the welding torch.

8. A submerged arc welding apparatus according to claim 1, wherein the flexible skirt portion includes a lower skirt portion having two ends, and a side skirt portion is attached to each end of the lower skirt portion.

9. A submerged arc welding apparatus according to claim 1, wherein the flexible skirt portion has a first edge that is connected to the body and a second edge that is pressed against the surface of the workpiece, wherein a perimeter of the second edge is wider than a perimeter of the first edge.

10. A submerged arc welding apparatus according to claim 9, wherein the flexible skirt portion is made of glass wool or a heat resistant material woven from aramid fiber, and the body is made of a heat resistant material selected from the group consisting of glass wool, metallic mesh, and a heat resistant fabric woven from aramid fiber.

11. A submerged arc welding apparatus according to claim 1, wherein the flexible skirt portion is made of glass wool or a heat resistant material woven from aramid fiber, and the body is made of a heat resistant material selected from the group consisting of glass wool, metallic mesh, and a heat resistant fabric woven from aramid fiber.

12. A submerged arc welding method according to claim 7, wherein the flux is a powder material.

* * * * *